UNITED STATES PATENT OFFICE.

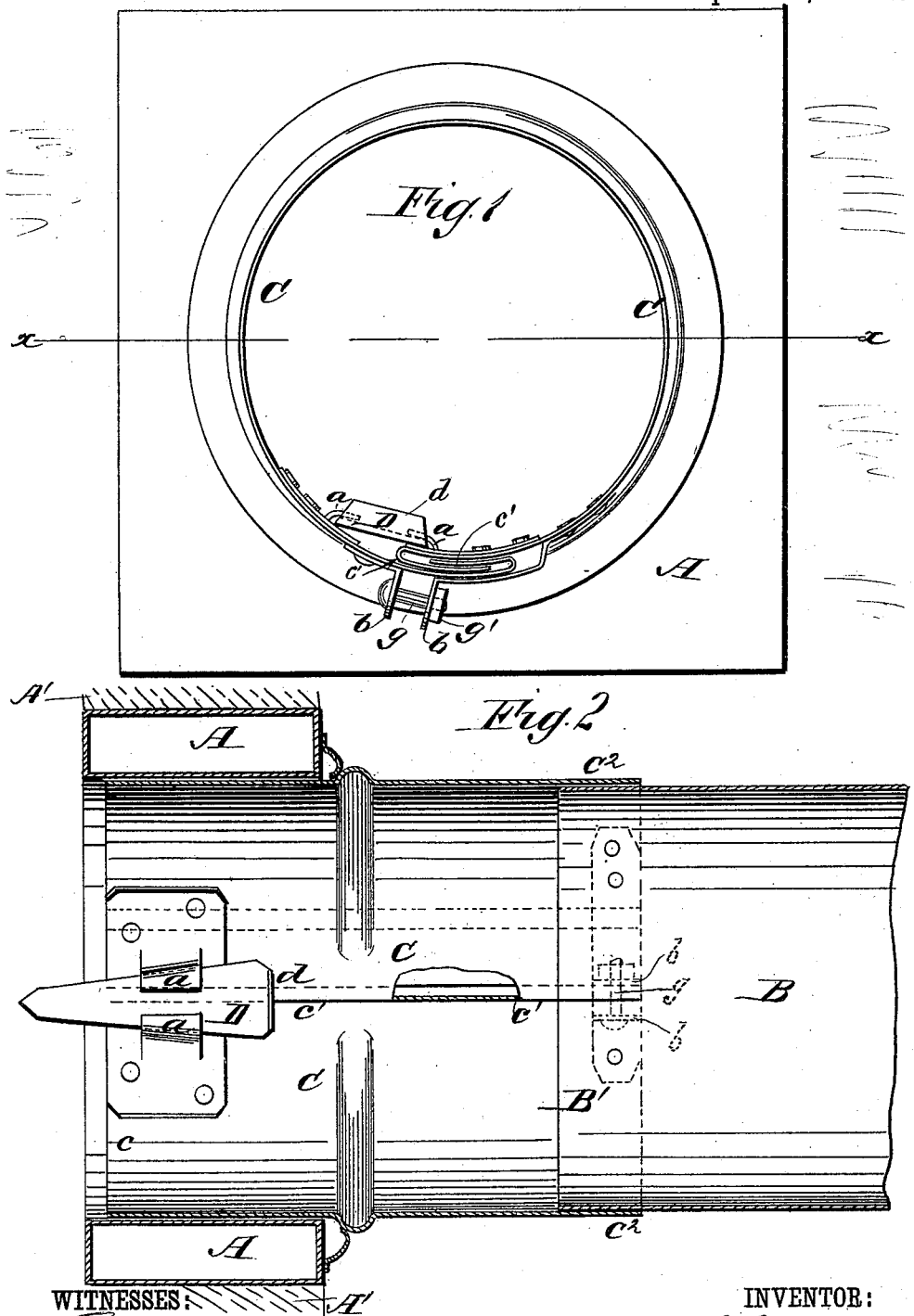

GODFRIED LAUBE, OF HURON, DAKOTA TERRITORY.

STOVE-PIPE CONNECTION.

SPECIFICATION forming part of Letters Patent No. 297,272, dated April 22, 1884.

Application filed September 26, 1883. (No model.)

*To all whom it may concern:*

Be it known that I, GODFRIED LAUBE, of Huron, Beadle county, and Territory of Dakota, have invented a new and useful Improvement in Stove-Pipe Connections, of which the following is a full, clear, and exact description.

This invention consists in a section of sheet-iron pipe having a loose folded and interlocked joint, and having ears, lugs, and a wedge, and attachments for the purpose of securely connecting the pipe with the chimney, as hereinafter described.

Reference is to be had to the accompanying drawings, forming a part of this specification, in which similar letters of reference indicate corresponding parts in both the figures.

Figure 1 is an end elevation of my improved connection in position within a chimney. Fig. 2 is a longitudinal sectional view of my improved connection, showing also the thimble, the stove-pipe, and the manner of connecting them together.

A is a thimble of the ordinary construction, arranged in the chimney A'. B is the stove-pipe, and C is my improved connection, which is made of sheet-iron. The joint $c'$ of the connection C is made by folding over two opposite edges of the iron and interlocking them loosely.

On the inside of the end $c$ of the connection C, and on each side of the joint $c'$, is a lug or ear, $a$, adapted to receive between them the wedge D, on the wide end of which is formed a lip, $d$, by which the wedge D is operated.

On the outside of the connection C, and near the end $c^2$, are two lugs, $b\ b$, one on each side of the joint $c'$. They project from the sides of the connection C at right angles therewith, and are peforated and adapted to receive the threaded bolt $g$ and nut $g'$.

The operation is as follows: The end $c$ of the short connection C is placed within the thimble A or within the aperture of the chimney. The wedge D is then inserted between the ears $a\ a$ and driven in tightly, by which means the end $c$ of the connection C is expanded and made to fill and bind within the thimble A or the aperture in the chimney, and thus the connection C is very firmly secured within the thimble or the chimney.

The end B' of the stove-pipe B is then placed within the end $c^2$ of the connection C, and the joint $c'$ is then drawn together by screwing the nut $g'$ onto the bolt $g$, whereby the end $c^2$ of the connection C is contracted and made to firmly clasp the end of the pipe B, thus completing the connection of the stove-pipe B to the chimney A'. When it is required to take down the stove-pipe, the nut $g'$ is unscrewed from the bolt $g$ and the end $c^2$ of the connection C is allowed to expand, releasing the end of the stove-pipe, which is then removed. The wedge D is then withdrawn from between the ears $a\ a$, thus releasing the hold of the connection C within the thimble, and the connection C is then removed.

The advantages obtained by my invention are that secure connections and tight joints are made between a stove-pipe and the thimble or chimney, thus avoiding the accidental withdrawal of the pipe from the chimney or the pushing of it in too far, whereby in the one case smoke or fire may escape into the apartment and in the other case the passage of the smoke from the stove-pipe to the chimney may be obstructed; also, that my improved connection being made with a loose joint, the diameter may be adapted to stove-pipes and thimbles of different sizes; furthermore, in the facility with which stove-pipes may be put up and taken down, avoiding the vexations and annoyances of adjusting stove-pipes connected in the ordinary manner.

Instead of the bolt and nut $g\ g'$, a wedge-shaped slide or other suitable clamping device may be used to contract and lock the end $c^2$ upon the pipe B.

Having thus described my invention, I claim as new and desire to secure by Letters Patent—

1. An expansible stove-pipe connection provided at opposite ends with mechanism for contracting and expanding said ends, respectively, substantially as set forth.

2. An expansible stove-pipe connection provided with mechanism on the inside thereof at one end for expanding said connection, and with mechanism on the other end outside of said connection for contracting it, substantially as set forth.

3. The stove-pipe connection C, having its edges overlapped, as at c c', and provided on its inside, near one end, with brackets a, and wedge D, for expanding that end of said connection, and with a device at its opposite end, outside of the connection, for contracting that end of said connection.

4. The connection C, constructed, substantially as described, with the loose joint c', the ears a a, and lugs b b, and adapted to receive the wedge D, and the bolt g and nut g', and to be attached to the thimble A or to the chimney-aperture, and to receive and be attached to the stove-pipe B, as set forth.

GODFRIED LAUBE.

Witnesses:
 FRANCIS ERWIN WEEKS,
 ALFRED STEERS.